United States Patent
Phillips

(12) 
(10) Patent No.: US 6,241,322 B1
(45) Date of Patent: Jun. 5, 2001

(54) QUICK-RELEASE BICYCLE AXLE FASTENER NUT

(76) Inventor: Cal M. Phillips, 4435 Jewell La., Platteville, WI (US) 53818

( * ) Notice: Subject to any disclaimer, the term of this patent is extended or adjusted under 35 U.S.C. 154(b) by 0 days.

(21) Appl. No.: 09/326,436

(22) Filed: Jun. 4, 1999

Related U.S. Application Data

(60) Provisional application No. 60/088,100, filed on Jun. 5, 1998.

(51) Int. Cl.$^7$ ..................................................... B60B 27/00
(52) U.S. Cl. ..................................... 301/124.2; 301/110.5
(58) Field of Search ............................ 301/110.5, 110.6, 301/124.1, 124.2, 55, 56, 59, 111

(56) References Cited

U.S. PATENT DOCUMENTS

| | | | | |
|---|---|---|---|---|
| 2,630,020 | * | 3/1953 | Juy | 301/124.2 |
| 3,922,018 | | 11/1975 | Shook . | |
| 4,033,627 | | 7/1977 | Morroni . | |
| 4,400,038 | * | 8/1983 | Hosokawa | 301/111 |
| 4,906,053 | * | 3/1990 | Kawai | 301/111 |
| 5,121,973 | * | 6/1992 | Phillips | 301/111 |
| 5,567,020 | | 10/1996 | Phillips . | |
| 5,653,512 | | 8/1997 | Phillips . | |
| 5,961,186 | * | 10/1999 | Phillips | 301/124.2 |

FOREIGN PATENT DOCUMENTS

| | | | | |
|---|---|---|---|---|
| 4128723 | * | 3/1993 | (DE) . | |
| 21764 | * | 11/1893 | (GB) | 301/24.1 |
| 658726 | * | 10/1951 | (GB) | 301/124.2 |
| 452295 | * | 2/1950 | (IT) | 301/124.2 |

* cited by examiner

*Primary Examiner*—S. Joseph Morano
*Assistant Examiner*—Long Bao Nguyen
(74) *Attorney, Agent, or Firm*—John V. Stewart

(57) ABSTRACT

An adjustment nut for a cam operated quick-release axle having a mechanism to stop the adjustment nut at a predetermined position. In the preferred embodiment, the adjustment nut 20 has a set-screw 21. On initial installation, the closing force of the cam lever is tested and adjusted by rotating the adjustment nut 20 until proper force is obtained, as with existing instructions for cam operated quick-release fasteners. At this point, the set-screw 21 is tightened against the end of the skewer. Wheel removal is performed by opening the cam and loosening the adjustment nut 20 for adequate clearance of the safety tabs 33. These operations are reversed for wheel installation. Unlike existing quick-release fasteners, readjustment of the cam clamping force is not needed, since it is fixed with the set-screw 21. The set-screw 21 is coated with a material to create additional friction to prevent it's loosening through subsequent operations.

2 Claims, 4 Drawing Sheets

QUICK-RELEASE BICYCLE AXLE FASTENER NUT

CROSS-REFERENCE TO RELATED APPLICATIONS

This application claims the benefit of U.S. Provisional Application No. 60/088,100, filed Jun. 5, 1998.

BACKGROUND OF THE INVENTION

1. Field of the Invention

This invention is in the field of quick-release bicycle axle fasteners.

2. Description of Prior Art

Cam-operated quick-release axle fasteners for bicycles have been available for years, but the original designs have inherent disadvantages. If the cam is accidentally left open or is knocked open during riding, or if the cam force adjustment is too loose, the wheel can fall off the bicycle during riding. To overcome this, fork makers designed "safety" drop-outs with outer surfaces having depressions, holes, or tabs which engage a complementary portion of the fastener. This retains the axle despite a loose cam. However, these devices reduced the convenience of quick-release fasteners, and introduced another safety problem. With "safety" drop-outs, opening the cam is not enough to release the axle. The user must also loosen an adjustment nut to clear the safety retention surface. To reinstall the axle, the user must re-tighten the adjustment nut to eliminate this clearance. This requires re-adjusting the cam tension on each use. Many users are not competent to perform this adjustment, resulting in a cam that is either dangerously loose or tight in the closed position.

Below are examples of prior efforts to improve the safety of quick-release axle fasteners. None of them provides an adjustment nut with a stopping point adjustment that stops the adjustment nut at the predetermined position to provide correct clamping tension on each use, as with the present invention.

U.S. Pat. No. 4,400,038 (Hosokawa) has a safety mechanism which prevents axle release until the cam lever is fully rotated. U.S. Pat. No. 4, 964,287 (Gaul) uses a cam with a removable lever or key for security. U.S. Pat. No. 4,805,941 (Segawa, FIGS. 4,5) offers a spring loaded safety interlock 5. U.S. Pat. No. 4,805,941 (Downing) has a safety hook for holding the axle in the dropout.

SUMMARY OF THE INVENTION

Objectives: The objective of this invention is to simplify the user's adjustment method to adjust the nut for proper clamping tension, having the following advantages:
1. Fast and precise adjustment nut positioning.
2. No adjustments needed after initial set-up.
3. Correct clamping tension every time with no trial and error.

Summary: These objectives are met in the present invention. The adjustment nut of a cam/lever quick-release bicycle axle fastener has means to stop the nut in the proper position to achieve proper clamping tension. To achieve proper clamping tension a set-screw 21 or stop nut 40 is used to stop the quick-release adjustment nut in the correct position. This adjustable set screw or stop nut can be pre-set to stop the quick-release nut in the correct position so that proper clamping tension is achieved repeatedly.

This device is safer than current quick-release adjustment nuts. It needs no adjustment after assembly, while current designs require readjustment each time a wheel is re-installed.

REFERENCE NUMBERS

Figure 1:
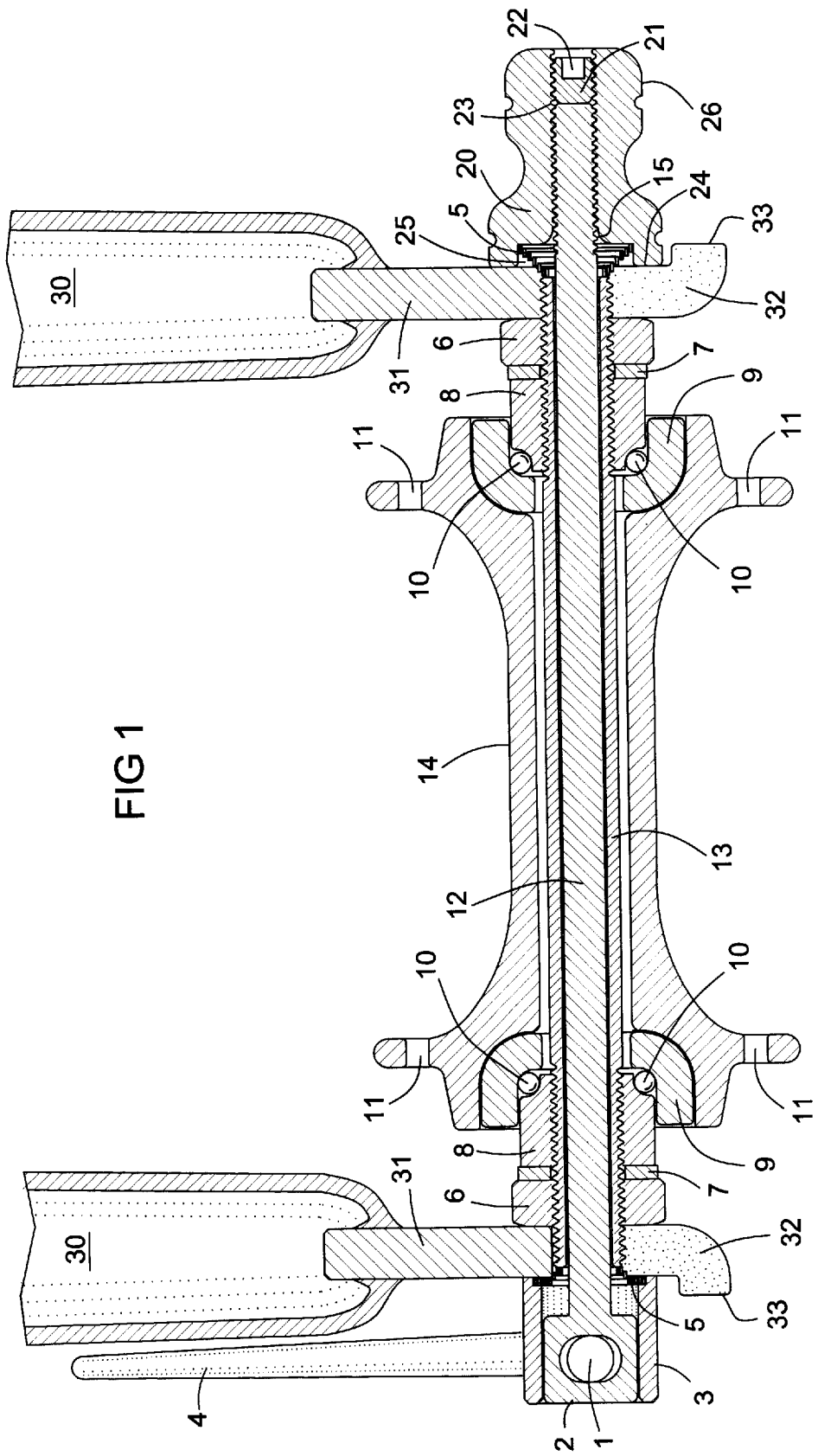
FIG. 1 is a front sectional view of a mounted wheel axle using the invention.
Figure 2:
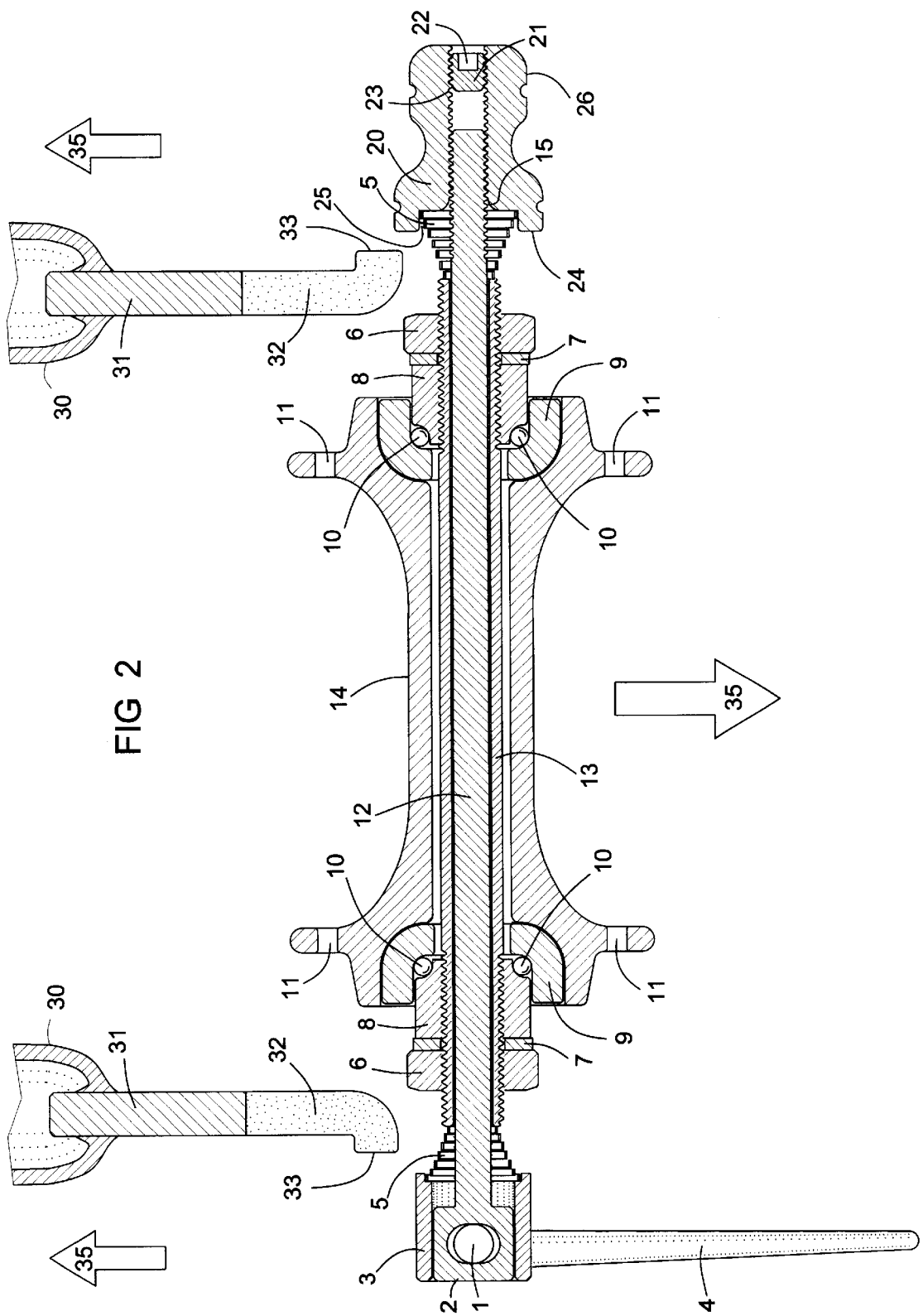
FIG. 2 is the view of FIG. 1 with the axle fastener loosened.
Figure 3:
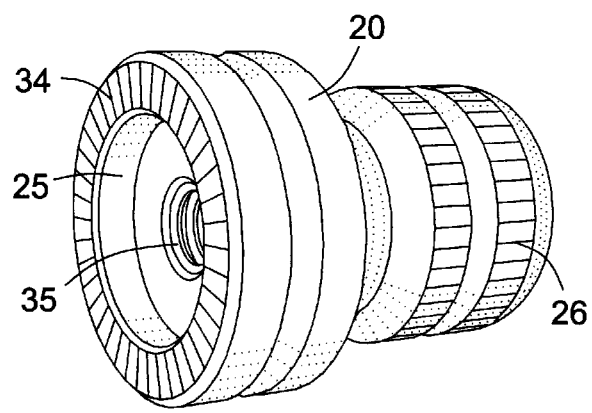
FIG. 3 is a perspective view of adjustment nut 20.
Figure 4:
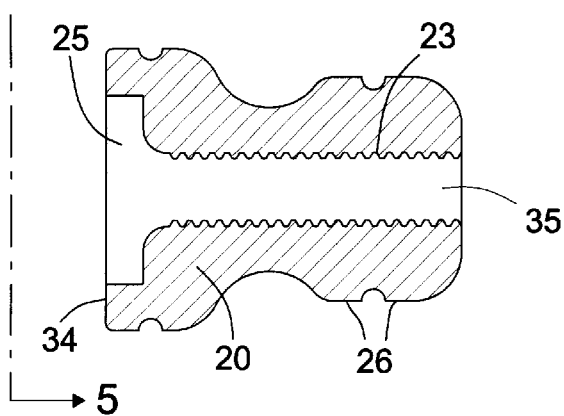
FIG. 4 is a sectional view of adjustment nut 20 taken along its axis.
Figure 5:
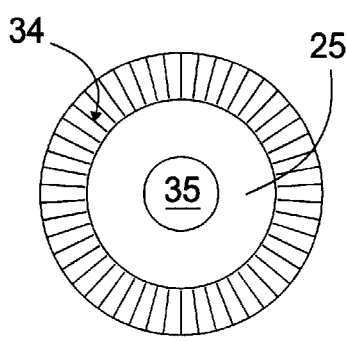
FIG. 5 is an inner end view of adjustment nut 20.

1. Cam
2. Cam-following head of skewer
3. Sliding sleeve
4. Lever
5. Spring
6. Lock nut on axle
7. Washer between lock nut and bearing race
8. Bearing race
9. Bearing cup
10. Ball Bearing
11. Spoke hole in hub
12. Control rod or skewer
13. Axle
14. Hub
15. Threads on control rod or skewer
20. Adjustment nut
21. Stop screw or set screw
22. Chamber in stop screw for tool.
23. Threads on adjustment nut
24. Outer surface of drop-out
25. Chamber in adjustment nut for spring
26. Outer end of adjustment nut to grip with fingers
30. Fork on bicycle frame
31. Drop-out
32. Open-ended slot
33. Safety tab or other coupling surface on drop-out
34. Serrations for increased friction
35. Threaded hole for skewer
39. Adjustment nut with enlarged chamber for stop nut
40. Stop nut
41. Flat on stop nut for tool
42. Nylon insert

Terminology

Cam: A mechanical component with a pivot axis, having a working surface that is eccentric or varying in radial distance from said axis.

Cam lever: An operating lever attached to a cam.

Drop-out: A plate with an open-ended slot for receiving a wheel axle mounted therein.

Safety drop-out: A drop-out having a coupling surface, such as a protrusion, depression, or hole, that engages a complementary portion of an axle fastener to retain the axle in the slot if the primary fastener mechanism is loose or disengaged.

Velocipede: A human-powered wheeled vehicle.

DESCRIPTION OF THE PREFERRED EMBODIMENTS

Referring to FIG. 1, a control rod or skewer 12 passes through a hollow axle 13. Attached to one end of the skewer is a standard cam/lever quick-release fastener (at left in drawing). Attached to the other end of the skewer is an adjustment nut 20. In the outer end of the adjustment nut 20, is a set-screw 21 that stops the inward threaded movement of the adjustment nut by contacting the end of the skewer.

For initial adjustment, the set-screw 21 is unscrewed to its maximum distal position. The adjustment nut 20 is then positioned according to conventional instructions for quick-release fasteners. This comprises a trial-and-error repetition of closing the cam lever, feeling the force required on the lever, opening the cam lever, tightening or loosening the adjustment nut an estimated amount, and repeating these steps until the cam lever closing force is correct. The correct force is often determined by feel, based on the experience of the person performing the adjustment. However, with this invention the adjustment is only done once, so a bicycle assembler or bike shop can perform it with a torque meter or other objective gauge. When correct cam force is achieved, the set-screw 21 is tightened against the end of the skewer. The set-screw holds its position in the adjustment nut as a set point or stopping point for the adjustment nut. The set-screw 21 should be coated with a material that partially locks its threaded position in the adjustment nut via increased friction to prevent it loosening. No further cam adjustment is needed in subsequent operations of the quick-release for removing and re-attaching the wheel.

The bicycle wheel is removed by opening the cam/lever and loosening the adjustment nut 20 for adequate clearance of the safety tabs. These operations are reversed for wheel installation. Unlike existing quick-release fasteners, readjustment of clamping force is not needed, since it is fixed with the set-screw 21.

Figure 6:
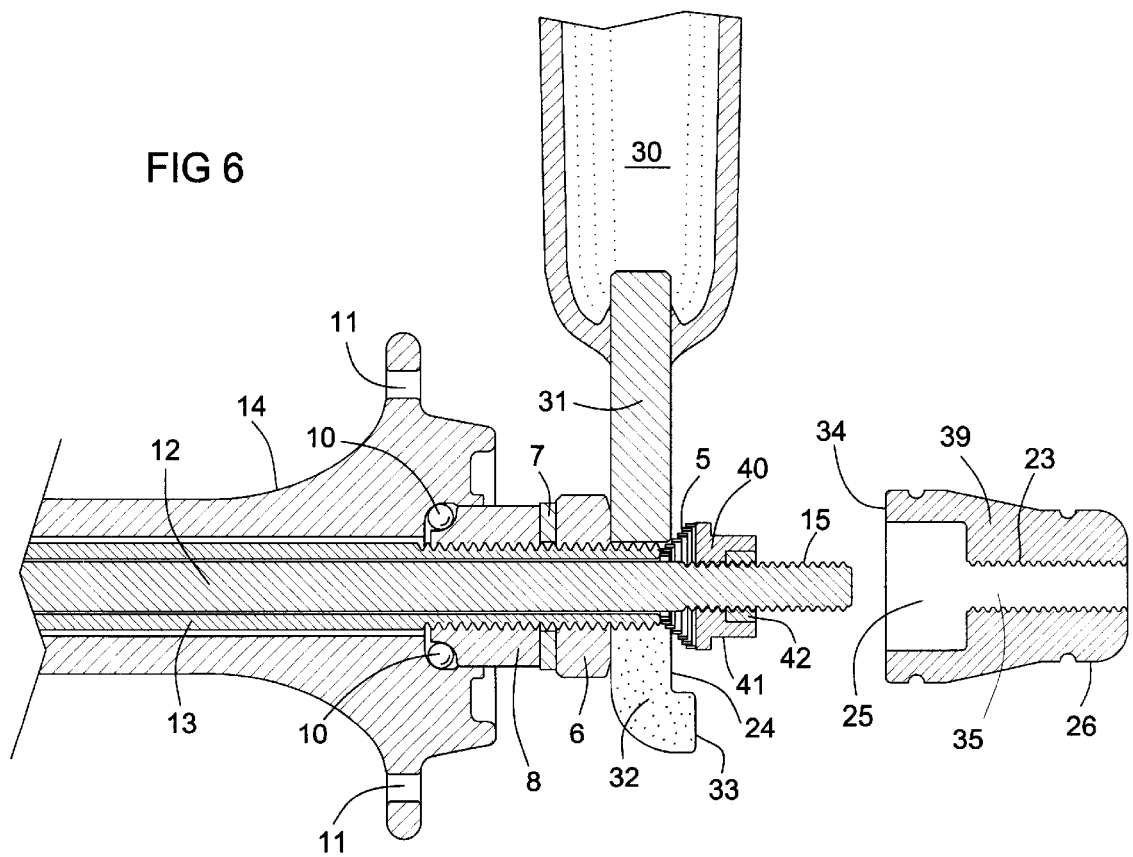
FIG. 6 is a partial front sectional view of an axle in a second embodiment with stop nut 40.
Figure 7:
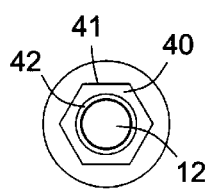
FIG. 7 is an outer end view of stop nut 40.
Figure 8:
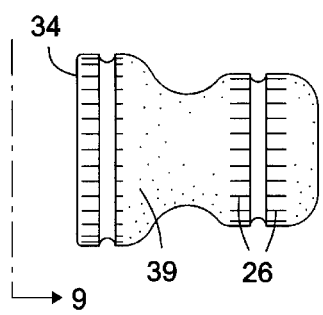
FIG. 8 is a front view of adjustment nut 39.
Figure 9:
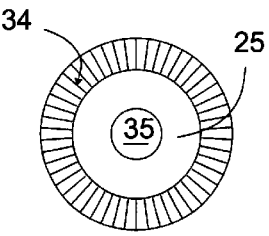
FIG. 9 is an inner end view of adjustment nut 39.

A second embodiment, shown in FIG. 6 provides similar advantages. Set-nut 40 is threaded on the skewer 12 and held via a nylon insert 42 or other thread locking means. Adjustment nut 39 is then threaded onto the skewer until it stops against the set-nut 40. The closing force of the cam lever is tested, and is adjusted by rotating the set-nut until proper force is obtained, per existing instructions for current cam/lever quick-release fasteners. Wheel removal is performed by opening the cam/lever, and loosening the adjustment nut 39 for adequate clearance of the safety tabs. These operations are reversed for wheel installation. Unlike existing quick-release fasteners, readjustment of clamping force is not needed, since it is fixed with the set-nut 40. The set-nut chamber 25 is cylindrical, not hexagonal. It does not turn the set-nut. To adjust the set-nut 40, a tool may be used on flats of set-nut 41.

The preferred embodiment is as shown and described in FIGS. 1–5. Both embodiments provide means to establish a stopping point for the adjustment nut that stops the nut at a predetermined setting.

Operation

The steps below apply to both embodiments.
Wheel Removal (FIG. 2):
1. Rotate the cam lever to the released position.
2. Loosen adjustment nut 20 to provide adequate clearance of the safety tabs.

Wheel Installation (FIG. 2 with the action arrows reversed):
1. With cam lever released, slide axle 13, into drop-outs 31.
2. Tighten adjustment nut 20, until it stops.
3. Rotate the cam lever to the locked position.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention. Although the invention is shown and described with respect to a bicycle, it can be used with other velocipedes, and in any application of mounting a hollow axle between two mounting plates with open-ended slots using a cam operated quick-release fastener.

I claim:

1. A method of adjusting a quick-release axle fastener comprising:

a hollow axle;

a control rod having a first end with a lever-operated cam, and a second end with external threads;

the control rod passing through the hollow axle;

an adjustment nut having an inner end, an outer end, and internal threads between the inner and outer ends of the adjustment nut;

the internal threads of the adjustment nut threaded onto the external threads of the control rod;

the adjustment nut having an exterior surface with a finger grip portion;

adjustable stopping means for stopping the adjustment nut at a predetermined depth of threading on the control rod;

the method comprising the steps of;

a) inserting the axle between two drop-outs;

b) adjusting the stopping means to an estimated position;

c) tightening the adjustment nut on the control rod until it stops against the stopping means;

d) operating the cam and observing the force required to close the cam;

e) adjusting the stopping means;

f) repeating from step d) until a predetermined cam closing force is achieved.

2. A quick-release axle fastener comprising:

a control rod having a first end with a lever-operated cam, and a second end with external threads;

an adjustment nut having an inner end, an outer end, and internal threads between the inner and outer ends of the adjustment nut;

the internal threads threaded onto the external threads of the control rod;

the adjustment nut having an exterior surface with a finger grip portion;

a stop nut with internal threads threaded onto the second end of the control rod; and the inner end of the adjustment nut having a chamber for receiving the stop nut, the chamber being larger than the stop nut in each respective dimension;

whereby the inner end of the adjustment nut is threaded onto the second end of the control rod to a predetermined depth stopped by contact of the adjustment nut against the stop nut.

* * * * *